United States Patent
Horstmann

(10) Patent No.: US 6,202,671 B1
(45) Date of Patent: Mar. 20, 2001

(54) CONTROL VALVE FOR CRYOGENIC LIQUID PROPELLANT

(75) Inventor: Markus Horstmann, Poing (DE)

(73) Assignee: Daimlerchrysler AG, Stuttgart (DE)

( * ) Notice: Subject to any disclaimer, the term of this patent is extended or adjusted under 35 U.S.C. 154(b) by 0 days.

(21) Appl. No.: 09/344,708

(22) Filed: Jun. 25, 1999

(51) Int. Cl.$^7$ ........................................ F16K 1/12
(52) U.S. Cl. ................... 137/219; 91/45; 92/27; 137/312; 251/31; 251/49; 251/94
(58) Field of Search .................. 91/45; 92/27; 137/219, 137/312; 251/31, 49, 94

(56) References Cited

U.S. PATENT DOCUMENTS 5,365,828 * 11/1994 Sperber et al. .................... 91/41

FOREIGN PATENT DOCUMENTS

3736750 * 5/1983 (DE).
3609765 * 9/1987 (DE).
4221230 * 7/1993 (DE).
4323846 * 11/1994 (DE).
0601794 * 6/1994 (EP).

* cited by examiner

Primary Examiner—Gerald A. Michalsky
(74) Attorney, Agent, or Firm—Ladas & Parry

(57) ABSTRACT

A valve for controlling flow of cryogenic liquid propellant in a rocket engine comprises a double acting piston-cylinder unit having a first position in which the valve is closed and a second position in which the valve is open, a locking device being engageable with the double acting piston-cylinder unit to lock the unit in the closed position of the valve is closed while being free from the valve in its open position. The locking device has a control piston connected to a locking member to selectively lock and unlock the piston-cylinder unit against the force of a spring acting to lock the piston-cylinder unit, and a control chamber capable of receiving a pressure medium to move the piston and to unlock the piston-cylinder unit. A two-way control valve controls flow of the pressure to the control chamber and to valve closing and opening operation chambers of the piston-cylinder unit. The valve opening chamber receives the pressure medium from the control chamber via a passageway which is blocked by the piston until the piston-cylinder unit is unlocked.

9 Claims, 2 Drawing Sheets

CONTROL VALVE FOR CRYOGENIC LIQUID PROPELLANT

FIELD OF THE INVENTION

The invention relates to a valve construction, particularly for controlling flow of a cryogenic liquid propellant.

BACKGROUND

A valve construction of this type is used as a propellant control valve in rocket engines and must remain in the open position from the beginning of ignition up to shutdown of the engine. It is known from DE 3,609,765 A1, DE 4,221, 230 C1 and DE 4,323,846 C1 to form an actuator controlled by a pressure medium for effecting the valve switching, the actuator being constructed as a single or double acting piston-cylinder unit which is spring-loaded in the direction of the valve closing position. In each of the two end positions of the piston-cylinder unit, a locking device, which moves transversely to the piston rod of the piston-cylinder unit, acts to lock the piston-cylinder unit in the respective valve position, even when there is a drop in the control pressure. The locking device is provided with two locking surfaces that are pre-stressed by a spring and act opposite one another. A pressure-controllable multiple piston arrangement, acts to release the respective locked locking surface by overcoming the pre-stress of the spring with a stroke activation of the piston cylinder unit from a form-fitting engagement with the piston rod, while the other locking surface remains engaged with the piston rod under the spring force until it engages in a corresponding recess of the piston rod at the end of stroke of the piston-cylinder unit. Such a valve construction with a pressure-controlled double-locking device acting in opposite directions has a relatively complicated mechanical structure and operation and is relatively sensitive to wear due to the frictional contact between the end-position locking device and the piston rod during the stroke motion, whereby it has limited switching reliability and the danger exists that the locking surfaces and the piston rod will jam in the opening stroke resulting in a blockage of the piston-cylinder unit in a partially opened, intermediate position of the valve.

SUMMARY OF THE INVENTION

An object of the invention is to provide a valve construction of the above type with a simplified construction and reduced weight and which has increased switching reliability.

The above and further objects are achieved by a valve for controlling flow of a cryogenic liquid propellant in a rocket engine which comprises a double acting piston-cylinder unit having a first position in which the valve is closed and a second position in which the valve is open, a locking device engageable with the double acting piston-cylinder unit to lock the unit in the first position when the valve is closed, the locking device including a control piston, a locking member coupled to said control piston to selectively lock and unlock said piston-cylinder unit, spring means acting on the control piston to urge the locking member to lock the piston-cylinder unit, and a control chamber capable of receiving a pressure medium to urge the piston, against the opposition of the spring means, to unlock the piston-cylinder unit when the piston-cylinder unit is in said second position and the valve is open. A two-way control valve has a first position in which the control chamber is connected to a source of the pressure medium and a second position in which a first operating chamber of the piston-cylinder unit is connected to the pressure medium to urge the valve to the closed position, the control chamber in the second position of the two-way control valve being vented, said first operating chamber in the first position of the two-way valve being vented, the piston-cylinder unit having a second operating chamber connected via a passageway to the control chamber to receive the pressure medium and urge the valve to said open position when the two-way control valve is in said first position.

In addition to the feature that the double-acting piston-cylinder unit is not pre-stressed by a spring in the valve closing direction, as in the prior art, the valve is held securely in the valve open position, even in the case of a drop in control pressure, by the pressure of the operating medium acting on the valve disk, i.e. the liquid propellant in the rocket engine. Thus, according to the invention, the expensive double-locking device of the prior art, which is subject to friction in both stroke directions, is eliminated and instead, the piston-cylinder unit is only mechanically locked by a locking member in the closed position of the valve. The complexity of the structure and of the end-position locking device of the prior art is reduced while wear of the valve drive will also be reduced. Additionally, the risk of jamming will also be considerably reduced, since the piston rod has absolutely no contact with the end-position locking device during the opening stroke. The valve according to the invention is thus excellently suitable for applications in which high precision and reliability are combined with strict weight limitations under extreme temperature conditions, such as in outer space. The connection to the operating chamber of the piston-cylinder unit which produces the valve opening stroke is closed in the closed position of the valve by the end-position locking device, whereas the connection to the valve closing chamber of the piston-cylinder unit is open. In this way, the cylinder chamber effecting the opening stroke of the valve will be pressure-activated only after the complete release of the end-position locking device so that the operation is substantially free from wear and jamming during the unlocking operation.

In a preferred embodiment, a delayed pressure activation of the piston-cylinder unit is produced in a simple manner by providing a passageway connecting the control chamber of the control piston and the valve opening chamber of the piston-cylinder unit and wherein the displacement of the control piston controls the opening of said passageway to the control chamber.

Preferably, said passageway contains a throttle or choke forming a constricted cross-section, in order to compensate for the pressure force applied to the valve disk by the operating medium, typically the liquid propellant, which adds to the stroke motion of the valve opening chamber by a relatively intensified pressure medium activation of the valve closing chamber without a choke and, in this way, a symmetrical switching property of the valve in the opening and closing directions is obtained.

In many cases, especially for the preferred use as a valve for low-temperature liquid fuels, the dynamic seals at the piston-cylinder unit do not offer sufficiently secure separation between the control pressure medium and the operating medium flowing through the valve. In a particularly appropriate embodiment of the invention, the piston-cylinder unit has two individual pistons rigidly connected together and wherein the pistons respectively define with an intermediate wall in the cylinder of the piston-cylinder unit arranged between the pistons, the operating chambers, and on opposite sides of the pistons, permanently vented relief chambers. In this way, a pressureless buffer zone is formed for each of the two operating chambers, which absorbs and discharges any fluid leakages both of the operating medium from the operating chambers and control pressure medium during operation of the valve thereby providing a highly secure, mutual isolation of the two pressure medium systems.

DETAILED DESCRIPTION

Figure 1:
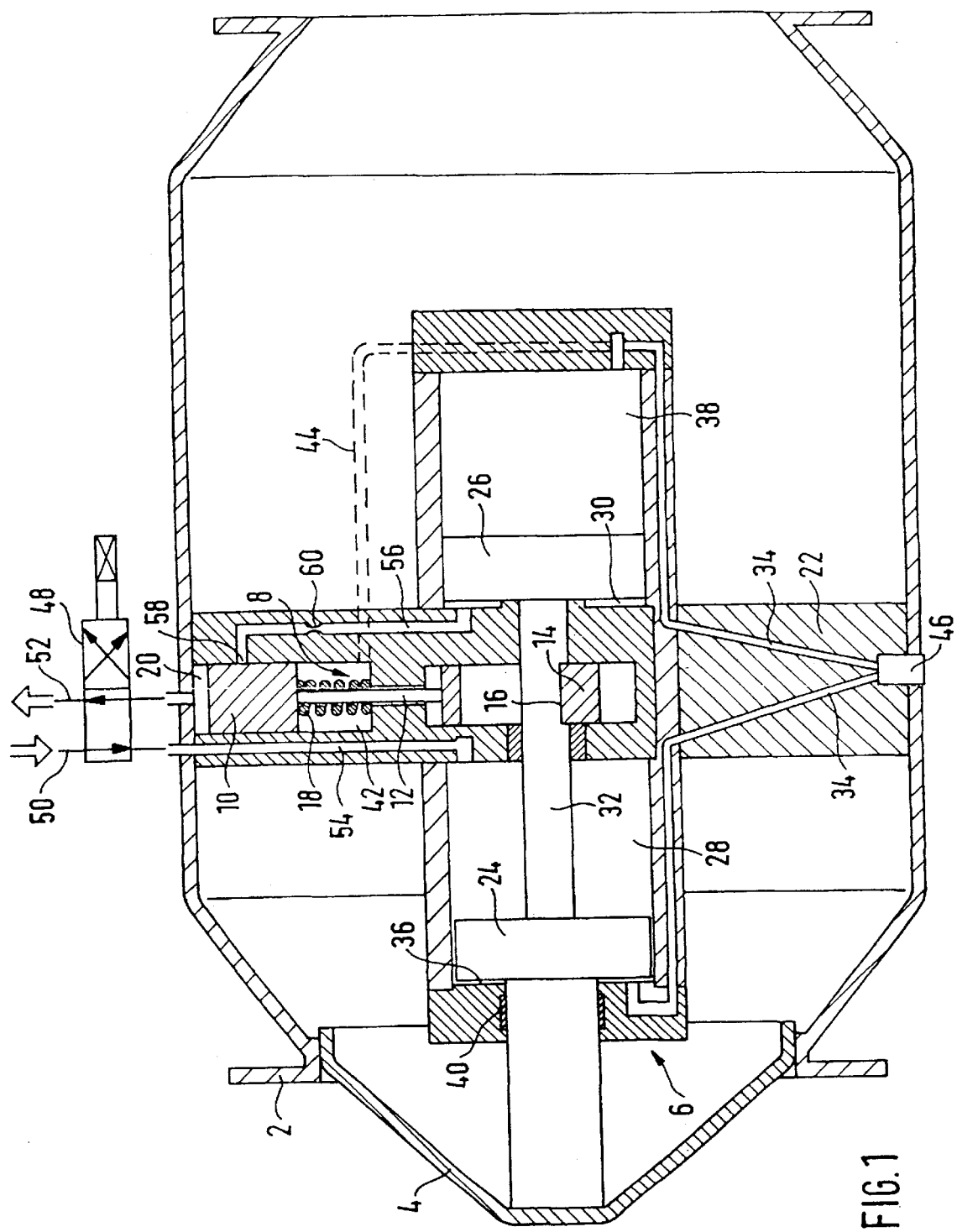
FIG. 1 is a longitudinal sectional view of a valve construction according to the invention in a valve closing position.

The valve construction shown in the drawing is a two-position valve for controlling flow of rocket propellants, usually cryogenic liquid oxygen or liquid hydrogen. The valve construction includes a valve 1 comprising valve seat 2 and a valve disk 4, a linear drive means for actuating valve disk 4 to move the disk 4 between an open position of the valve in which the disk 4 is spaced from seat 2 (FIG. 2) and a closed position in which the valve disk 4 is seated on seat 2 (FIG. 1). The linear drive means is in the form of a double-acting piston-cylinder unit 6. The valve construction also includes an end-position locking device 8 for locking the piston-cylinder unit 6 when the valve is closed as shown in FIG. 1.

The end-position locking device 8 includes a control piston 10 which is movable transversely with respect to the stroke direction of the piston-cylinder unit 6, a rod 12 connected to piston 10 and a locking member 14 secured at the end of rod 12 and having a locking surface 16 for locking the piston-cylinder unit 6 in the closed position of the valve 1. A pressure spring 18 acts on the piston 10 to urge the locking member 14 to engage the piston-cylinder unit 6 and lock it in the closed position of the valve. The piston 10 faces a control chamber 20 adapted to receive a control pressure medium to displace piston 10 against the opposition of spring 18 and unlock the locking member 14 from the piston-cylinder unit 6. The locking device 8 is contained in an intermediate wall 22 in the piston-cylinder unit 6. On one side the wall 22 is a first operating chamber 28 (a valve closing chamber) and an adjoining piston 24 and on the opposite side of the wall is a second operating chamber 30 (a valve opening chamber) and an adjoining piston 26. The pistons 24 and 26 are rigidly connected by a piston rod 32 which travels axially in piston-cylinder unit 6. The disk 4 is fixed to piston 24 by an extension rod 25 so as to be moved towards and away from seat 2 in accordance with the movement of the piston 24. The piston rod 32 extends sealingly through intermediate wall 22. On the sides of pistons 24 and 26 opposite the operating chambers 28 and 30 are relief chambers 36 and 38 which are permanently vented. The chambers 36 and 38 are connected by return channels 34 to a collecting port 46 open to the atmosphere. The passageways 34 collect and discharge any leakages of the liquid propellant flowing past seal 40 and control pressure medium escaping past piston seals (not shown) on pistons 24 and 26. In this way, a secure separation is obtained between the systems for pressure medium supplied to the operating chambers and liquid propellant. Leakages of pressure medium which reach the spring chamber 42 of control piston 10 from operating chambers 28 and 30 via piston rod 32, locking member 14 and rod 12, is also discharged to collecting port 46 by means of a permanently vented return channel 44 (shown in dashed lines).

The control pressure medium used for operating the valve construction is a pressurized gas, typically helium under a pressure of approximately 70 bars. The pressure medium is selectively conducted to operating chambers 28, 30 of piston-cylinder unit 6 and to control chamber 20 of the locking device 8 by means of a solenoid-actuated two-way control valve 48 associated with an inlet line 50 for the pressurized gas and a vent line 52 connected to ambient atmosphere. As shown in FIG. 1, in the closed and locked position of valve 1, pressure chamber 20 is vented and pressure medium is supplied to valve closing chamber 28 of piston-cylinder unit 6 by means of a connection channel 54 in intermediate wall 22. A second connection channel 56 forms a passageway connecting valve opening chamber 50 to control pressure chamber 20. The passageway 56 has an opening 58 into chamber 20 which is blocked by piston 10 in the locking position of locking device 6. A throttle or choke 60 having a constricted cross-section is included in passageway 56.

In the closed position of valve 1 shown in FIG. 1 operating chamber 28 is pressurized by the pressure medium by means of valve 48 and presses valve disk 4 against seat 2 in opposition to the propellant pressure acting on the disk 4 of a magnitude of approximately 15 bars. Additionally, piston rod 32 is locked by locking member 14 which is engaged in a recess 62 in piston rod 32 under the force of spring 18, so that the valve 1 will remain in the closed position even if there should be a drop in the pressure of the pressurized gas.

Figure 2:
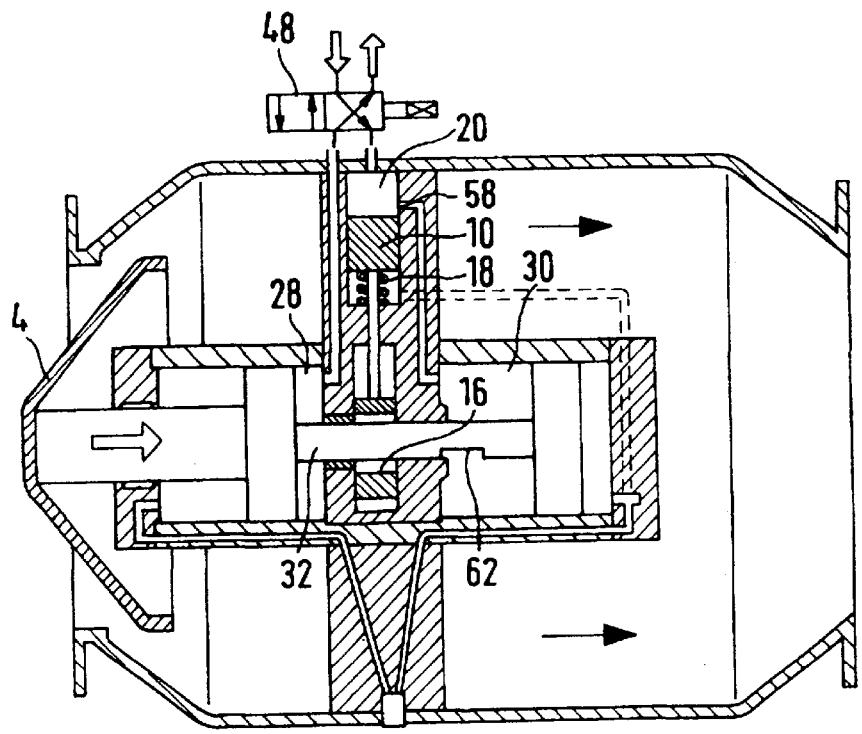
FIGS. 2 and 3 show the valve construction in FIG. 1, on reduced scale, in intermediate positions during valve opening and closing strokes.

When valve 48 is switched to the position shown in FIG. 2, valve closing chamber 28 is vented and control chamber 20 is pressurized. Control piston 10 travels downwardly against the force of spring 18, to cause locking surface 16 of locking member 14 to move out of recess 62 in the piston rod. The opening 58 of passageway 56 remains blocked by piston 10 until the piston has traveled a sufficient distance to move the locking member 14 out of recess 62 to unlock the piston-cylinder unit 6. Then, pressure medium can flow from chamber 20 through passageway 56 to valve opening chamber 30, urging the piston-cylinder unit 6 to open valve 1. The pressure of the propellant applied to valve disk 4 also acts to open the valve 1. Approximately the same switching behavior of the valve in the opening and closing directions is achieved by the provision of throttle 60 in passageway 56.

Figure 3:
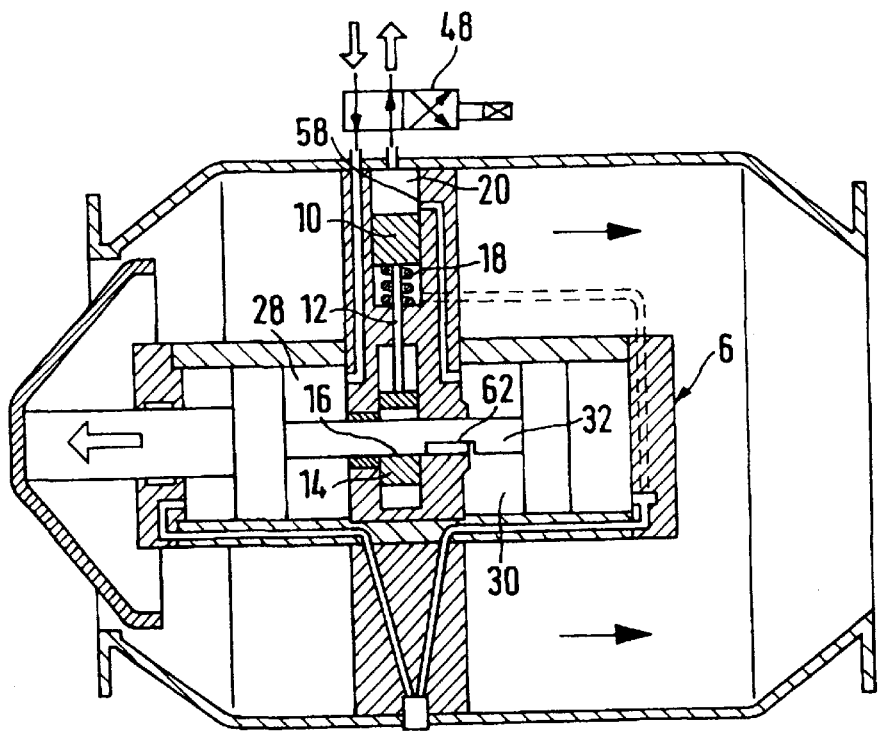

At the end of the opening stroke, the valve 1 remains in the completely opened position due to the sustained pressure loading of operating chamber 30. Even in the case of a drop in pressure of the pressurized gas, the pressure applied to valve disk 4 by the liquid propellant flowing through valve 1 in the direction of the arrows in FIGS. 2 and 3 is sufficient to keep the valve 1 in the completely open position. Consequently, an additional end-position locking device as in the prior art is not needed for the open position of valve 1.

For the return to the closed valve position, two-way valve 48 is switched back to the position shown in FIGS. 1 and 3. Valve closing chamber 28 is then pressurized and control pressure chamber 20 is vented. The locking member 14 engages in the recess 62 in piston rod 32 under the force of spring 18. The opening 58 of passageway 56 provides venting of chamber 30 during the closing of valve 1 until piston-cylinder unit 6 reaches the closed position and locking member 14 engages in the recess 62 whereupon piston 10 blocks the opening 58.

Although the invention is disclosed with reference to a particular embodiment thereof, it will become apparent to those skilled in the art that numerous modifications and variations can be made which will fall within the scope and spirit of the invention as defined by the attached claims.

What is claimed is:

1. A valve for controlling flow of cryogenic liquid propellant in a rocket engine comprising:

a double acting piston-cylinder unit having a first position in which the valve is closed and a second position in which the valve is open, a locking device engageable with the double acting piston-cylinder unit to lock said unit in said first position when the valve is closed, said locking device including a control piston, a locking member coupled to said control piston to selectively lock and unlock said piston-cylinder unit, a spring acting on said control piston to urge the locking member to lock the piston-cylinder unit, and a control chamber capable of receiving a pressure medium to urge said piston, against the opposition of the spring, to unlock said piston cylinder unit, a two-way control valve having a first position in which said control chamber is connected to a source of said pressure medium and a second position in which a first operating chamber of said piston-cylinder unit is connected to said pressure medium to urge the valve to said closed position, said control chamber in said second position of the two-way control valve being vented and said first operating chamber in said first position of said two-way valve being vented, said piston-cylinder unit having a second operating chamber connected via a passageway to said control chamber to receive said pressure medium and urge the valve to said open position when the two-way control valve is in said first position.

2. A valve as claimed in claim 1, wherein said passageway is located so as to be blocked by said control piston until said piston-cylinder unit has been unlocked whereupon said passageway is now connected to said control chamber and receives the pressure medium to supply the pressure medium to said second operating chamber to urge the piston-cylinder unit to said second position.

3. A valve as claimed in claim 1, comprising a throttle in said passageway.

4. A valve as claimed in claim 1, wherein said piston-cylinder unit comprises first and second pistons located on opposite sides of an intermediate wall to define said first and second operating chambers between said intermediate wall and the respective pistons.

5. A valve as claimed in claim 4, comprising a piston rod rigidly connecting said first and second pistons together, said piston rod having a recess in which said locking member is engaged when the piston-cylinder unit is locked in the closed position of the valve.

6. A valve as claimed in claim 5, wherein said first and second pistons of said piston-cylinder unit define first and second relief chambers respectively on sides of said first and second pistons opposite said first and second operating chambers, said first and second relief chambers being permanently vented.

7. A valve as claimed in claim 6, comprising further passageways connected to said relief chambers and a collection port connected to said passageways to vent the passageways and said relief chambers.

8. A valve as claimed in claim 4, comprising an additional passageway connected to said two-way control valve and to said first operating chamber, both of the passageways being disposed in said intermediate wall.

9. A valve as claimed in claim 1, wherein said double acting piston-cylinder unit has a stroke direction when moving between said first and second positions thereof, said control piston being movable in a direction traverse to the stroke direction of the piston-cylinder unit.

* * * * *

UNITED STATES PATENT AND TRADEMARK OFFICE
CERTIFICATE OF CORRECTION

PATENT NO.    : 6,202,671 B1
DATED         : March 20, 2001
INVENTOR(S)   : Markus Horstmann It is certified that error appears in the above-identified patent and that said Letters Patent is hereby corrected as shown below:

<u>Title page,</u>
Insert -- [30] Foreign Application Priority Data, Jun. 25, 1998 (DE) ... 198 28 199.4 --.

Signed and Sealed this

Thirtieth Day of April, 2002

*Attest:*

*Attesting Officer*

JAMES E. ROGAN
*Director of the United States Patent and Trademark Office*